J. C. SANDER.
METHOD OF UNITING CABLE ENDS.
APPLICATION FILED MAY 10, 1920.

1,363,355.  
Patented Dec. 28, 1920.

Inventor  
JACOB C. SANDER  
By his Attorneys

UNITED STATES PATENT OFFICE.

JACOB C. SANDER, OF LYNN, MASSACHUSETTS, ASSIGNOR TO THOMSON ELECTRIC WELDING COMPANY, OF BOSTON, MASSACHUSETTS, A CORPORATION OF MASSACHUSETTS.

METHOD OF UNITING CABLE ENDS.

1,363,355.   Specification of Letters Patent.   Patented Dec. 28, 1920.

Application filed May 10, 1920. Serial No. 380,081.

*To all whom it may concern:*

Be it known that I, JACOB C. SANDER, a citizen of the United States, and a resident of Lynn, in the county of Essex and State of Mass., have invented certain new and useful Improvements in Methods of Uniting Cable Ends, of which the following is a specification.

My invention relates to an improved method of uniting the ends of cables such as are made up of a multiplicity or bundle of individual strands of wire twisted or otherwise wrapped together.

The object of the invention is to secure a positive and effective union between the cable ends and in such way that there will be no stray strands of the cable which have not been united or held in place.

As an instrumentality in effecting the union I preferably employ the heating effect due to the passage of an electric current from one cable end to the other across the joint. This causes the metal at the joint to become plastic and upon the application of endwise pressure the parts are forced together and welded. This part of the method is the ordinary and well known method of electric resistance welding now universally used in the arts.

The invention consists in the improved method of uniting cables hereinafter more particularly described and then specified in the claims.

In the accompanying drawings, Figure 1 diagrammatically illustrates two cable ends arranged in the clamps of an electric welding machine in accordance with this invention.

Figure 1:
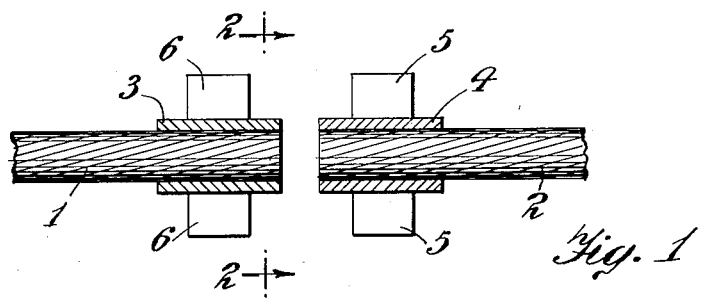
Figure 2:
Fig. 2 is a transverse cross-section through one of the cables with its retaining sleeve or ferrule, the same being taken on the line 2—2 Fig. 1.

1 and 2 indicate lengths of cable made up of a multiplicity of fine wires or strands twisted together and the ends of which it is desired to unite.

3 and 4 indicate separate metallic sleeves or ferrules fitting closely over the cable and securely holding the individual strands together. A sleeve is applied to the end of each cable and its end is preferably but not necessarily brought flush with the ends of the strands of the cable. Both the parts are then inserted in the clamps, diagrammatically indicated at 5 and 6, of an electric butt-welding machine of any suitable type.

The clamps 5 and 6 are of any desired kind and such that they effectively clamp and hold the cable ends and sleeves.

As is well known in electric butt-welding apparatus, the one clamp, as for instance 5, is caused to approach the other clamp to bring the cable ends into abutted contact after which an electric current is caused to flow from one clamp to the other across the joint.

In the present method the current flows from the cable 2 to the cable 1 and also from the sleeve 4 to the sleeve 6. In so passing the current heats the cable ends as well as the sleeve ends and renders both plastic after which pressure is applied longitudinally of the cable and preferably by means of the clamp 5 as is usual.

Figure 3:
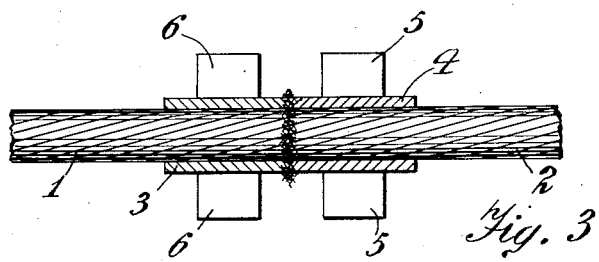
Fig. 3 is a view similar to Fig. 1 after the welding operation is completed.

This endwise pressure upsets the ends of the cables as well as the ends of the sleeves and forms a "bur" indicated at 10 in Fig. 3. The effect of this arrangement is that the ends of the sleeves or ferrules weld together, the ends of the individual strands are butt-welded to the ends of the strands of the other cable and are also side-welded to each other within the sleeves and the strands and sleeves are welded to each other all in one composite mass.

Figure 4:
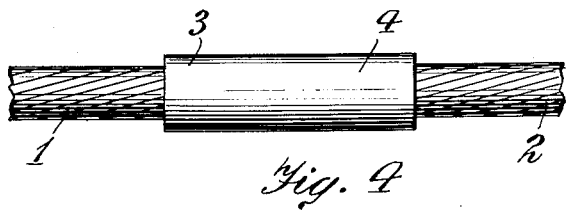
Fig. 4 is a side elevation of the cable after the operation is completed.

The bur 10 formed on the outside of the sleeves or ferrules 3, 4 may if desired be removed in any desired manner so that a smooth finish is attained as indicated in Fig. 4.

If desired the ferrules or sleeves 3, 4 may be split so that the clamps 5 and 6 will cause them to grip tightly around the cable strands.

What I claim as my invention is:—

1. The method of uniting cables, consisting in applying a sleeve or ferrule to the end of each cable, assembling the parts in abutted relation in the clamps of an electric welding machine and welding the ends of the sleeves to each other and the ends of the cables together within the sleeves.

2. The method of uniting cables comprising a multiplicity of strands of wire, consisting in applying a separate sleeve over the end of each cable to hold the strands together and electrically butt-welding the ends of the cables and the ends of the surrounding sleeves whereby the sleeves and cables are butt-welded together and the cables are welded to the sleeves.

3. The method of uniting the ends of twisted wire cables, consisting in applying an open ended sleeve over the end of each cable to hold the strands firmly in place, bringing the ends of the cables and the ends of the sleeves in abutted relation in the clamps of an electric welding apparatus, passing current and applying pressure whereby the cable and sleeve ends are all welded together and to each other in a composite mass.

Signed at New York, in the county of New York and State of New York, this 6th day of May, A. D. 1920.

JACOB C. SANDER.